(12) United States Patent
Miyashita et al.

(10) Patent No.: US 6,791,638 B2
(45) Date of Patent: Sep. 14, 2004

(54) LIGHTING PANEL FOR A DISPLAY

(75) Inventors: Junji Miyashita, Yamanashi-ken (JP); Kenji Matsumoto, Tokyo (JP)

(73) Assignees: Citizen Electronics Co., Ltd., Yamanashi-ken (JP); Citizen Watch Co., Ltd., Tokyo (JP)

( * ) Notice: Subject to any disclaimer, the term of this patent is extended or adjusted under 35 U.S.C. 154(b) by 18 days.

(21) Appl. No.: 10/378,566

(22) Filed: Mar. 3, 2003

(65) Prior Publication Data
US 2003/0169586 A1 Sep. 11, 2003

(30) Foreign Application Priority Data
Mar. 11, 2002 (JP) ........................................ 2002-066169

(51) Int. Cl.⁷ ............................................ G02F 1/1335

(52) U.S. Cl. ............................................ 349/65; 362/31

(58) Field of Search ............................ 349/65; 362/31, 362/26, 235, 555

(56) References Cited

U.S. PATENT DOCUMENTS

| 6,582,095 | B1 | * | 6/2003 | Toyoda ........................ 362/235 |
| 6,603,520 | B2 | * | 8/2003 | Umemoto et al. ............. 349/65 |
| 6,731,355 | B2 | * | 5/2004 | Miyashita ..................... 349/65 |

* cited by examiner

Primary Examiner—James A. Dudek
(74) Attorney, Agent, or Firm—Dennison, Schultz, Dougherty & MacDonald

(57) ABSTRACT

There is provided a lighting panel having rectangular both surfaces one of which is a reflection surface and the other is a discharge surface, an edge light provided at a corner of the lighting panel. A plurality of prisms are circularly formed on the reflection surface of the lighting panel. Each of the prisms has a vertical angle $\theta$ comprising a first inclination angle $\theta 1$ on the edge light side and a second inclination angle $\theta 2$ opposite to the first inclination angle $\theta 1$. The first inclination angle $\theta 1$ is set to 89.5°~60°, and there is a following relationship between the first inclination angle $\theta 1$ and the second inclination angle $\theta 2$:

$\theta 1(\theta 1.1 \sim \theta 1.n) > \theta 2$ $\theta 1.1 \leq \theta 1.2 \leq \ldots \theta 1.(m-1) \leq \theta 1.m \ldots \theta 1.(n-1) \leq \theta 1.n$

4 Claims, 5 Drawing Sheets

LIGHTING PANEL FOR A DISPLAY

BACKGROUND OF THE INVENTION

The present invention relates to a lighting panel for a display such as liquid crystal display (LCD) for illuminating the display from the underside thereof as a back light.

FIG. 10 is a plan view showing a conventional lighting panel, and FIG. 11 is a sectional view taken along a line XI—XI of FIG. 10.

The lighting panel 12 made of a transparent plastic has a rectangular shape in plan view and an incident surface 12a by beveling a corner. An edge light 11 of an LED is provided corresponding to the corner 12a. On the underside of the lighting panel 12, a plurality of prisms 12b are formed as reflector members. The prisms 12b are concentrically formed with the light discharge point of the edge light 11 as shown in FIG. 11. The prism 12b has a vertical angle of 90 degrees.

The light emitted from the edge light 11 enters the lighting panel 12. The light in the lighting panel 12 is reflected by the prisms 12b and discharged from a discharge surface 12c. The discharged light enters a diffusion sheet 13 and discharges from the diffusion sheet to be applied to an LCD (not shown) in diffused rays.

Light discharged from the underside of the lighting panel 12 is reflected by a reflector sheet 14 to be returned to the lighting panel 12.

In such a device, the intensity of light becomes reduced toward the end distant from the edge light 11. Therefore, the LCD is not uniformly illuminated.

Furthermore, since the intensity of light in an area near the edge light is very high, prisms 12b must be arranged at high density, which causes the manufacturing cost to be increased and quality of the lighting panel 12 to reduce.

SUMMARY OF THE INVENTION

An object of the present invention is to provide a lighting panel which may be easily manufactured with simple arrangement of prisms.

According to the present invention, there is provided a panel for lighting a display comprising a lighting panel made of a transparent plastic and having rectangular both surfaces one of which is a reflection surface and the other is a discharge surface, an incident surface formed by beveling one of corners of the lighting panel, an edge light provided corresponding to the incident surface, a plurality of prisms circularly formed on the reflection surface of the lighting panel, edge lines of the prisms being concentrically arranged with the edge light at a predetermined interval, each of the prisms having a vertical angle θ comprising a first inclination angle θ1 (θ1.1~θ1.n) on the edge light side and a second inclination angle θ2 opposite to the first inclination angle θ1, wherein the first inclination angle θ1 is set to 89.5°~60°, and there is a following relationship between the first inclination angle θ1 and the second inclination angle θ2:

θ1 (θ1.1~θ1.n)>θ2

θ1.1≦θ1.2≦ ... θ1.(m−1)≦θ1.m ... θ1.(n−1)≦θ1.n

The panel further comprises a prism sheet disposed corresponding to the discharge surface of the lighting panel, the prism sheet having a plurality of prisms on a surface corresponding to the discharge surface.

The prism has a circular edge line.

In another aspect, the prism is a circular lenticular lens.

These and other objects and features of the present invention will become more apparent from the following detailed description with reference to the accompanying drawings.

DETAILED DESCRIPTION OF THE PREFERRED EMBODIMENT

Figure 1:
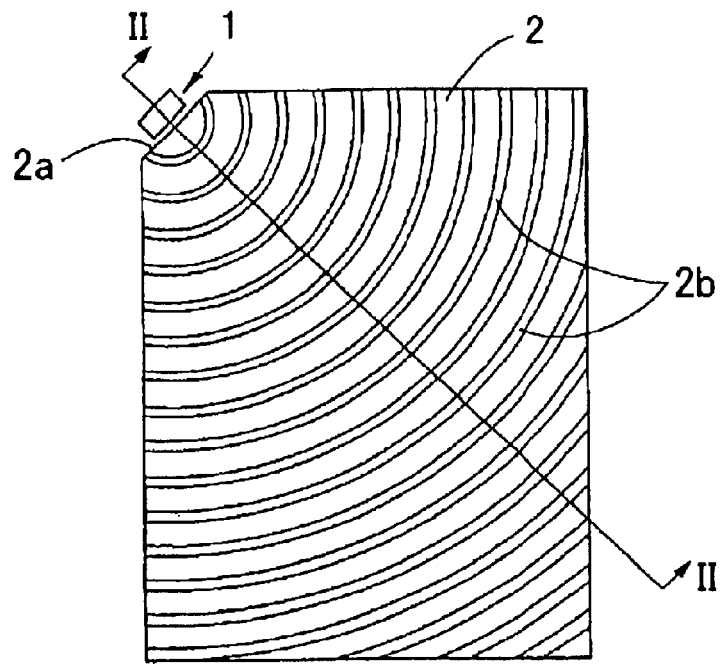
FIG. 1 is a plan view showing a lighting panel in a first embodiment of the present invention.
Figure 2:
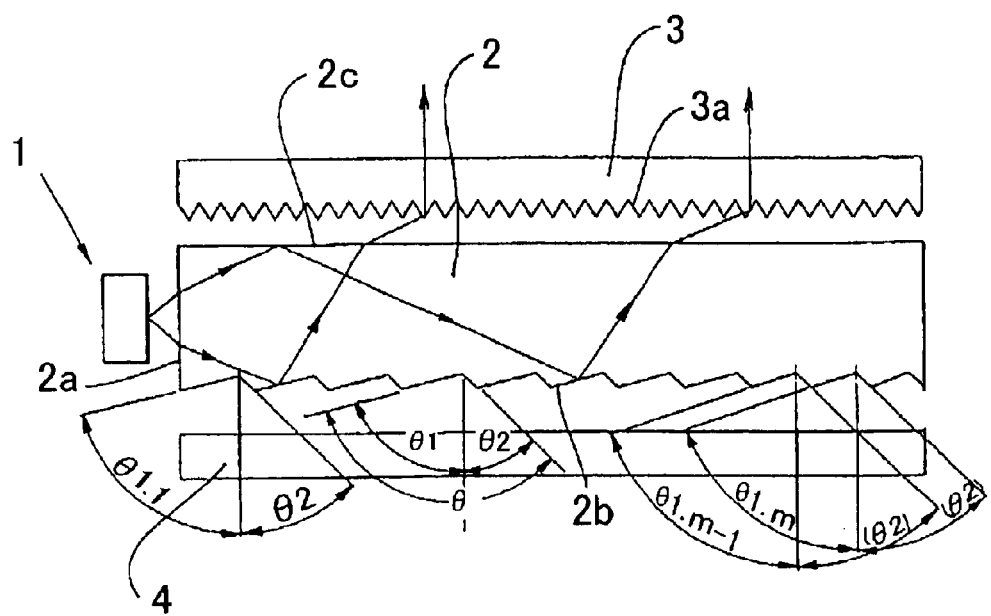
FIG. 2 is a sectional view taken along a line II—II of FIG. 1.

Referring to FIGS. 1 and 2, a lighting panel 2 made of a transparent plastic has a rectangular shape in plan view and beveled at a corner to form a flat incident surface 2a. An edge light 1 of an LED is provided corresponding to the incident surface 2a. On the underside of the lighting panel 2, a plurality of prisms 2b are circularly formed. Each of the prisms is inwardly projected as a reflector surface. The edge lines of the prisms 2b are concentrically formed with the light discharge point of the edge light 1 and arrange at a predetermined interval as shown in FIG. 1. Each of the prisms 2b has a sectional shape of a saw tooth, and has the same vertical angle e. The vertical angle θ comprises a first inclination angle θ1 (θ1.1~θ1.n) on the edge light side and a second inclination angle θ2 on the opposite side to the first inclination angle θ1. The angle of the first inclination angle θ1(θ1.1~θ1.n) is 89.5°~60°. The inclination angle θ1 is set so as to increase toward the end distant from the edge light 1. Namely, the angle changes from θ1.1 at a position near the edge light 1 to θ1.n at a position near the end through θ1.m. The angle of the second inclination angle θ2 is constant. There is a following relationship between the first inclination angle θ1(θ1.1~θ1.n) and the second inclination angle θ2.

θ1(θ1.1~θ1.n)>θ2 and a relationship of

θ1.1≦θ1.2≦ ... θ1.(m−1)≦θ1.m ... θ1.(n−1)≦θ1.n

In other words, the edge lines of the prisms 2b are concentrical circles with the edge light 1 in which the first inclination angle θ1 is changed, keeping the second inclination angle constant.

The light emitted from the edge light 1 enters the lighting panel 2. The light in the lighting panel 2 is reflected by the prisms 2b and discharged from a discharge surface 2c. The discharge light enters a prism sheet 3 having micro prisms 3a and discharges from the prism sheet to be applied to an LCD (not shown).

Light discharged from the underside of the lighting panel 2 is reflected by a reflector sheet 4 to be returned to the lighting panel 2.

The reason for setting the above described formula $\theta 1$ ($\theta 1.1 \sim \theta 1.n$)=(89.5°~60°)>$\theta 2$ will be described hereinafter.

Figure 3:
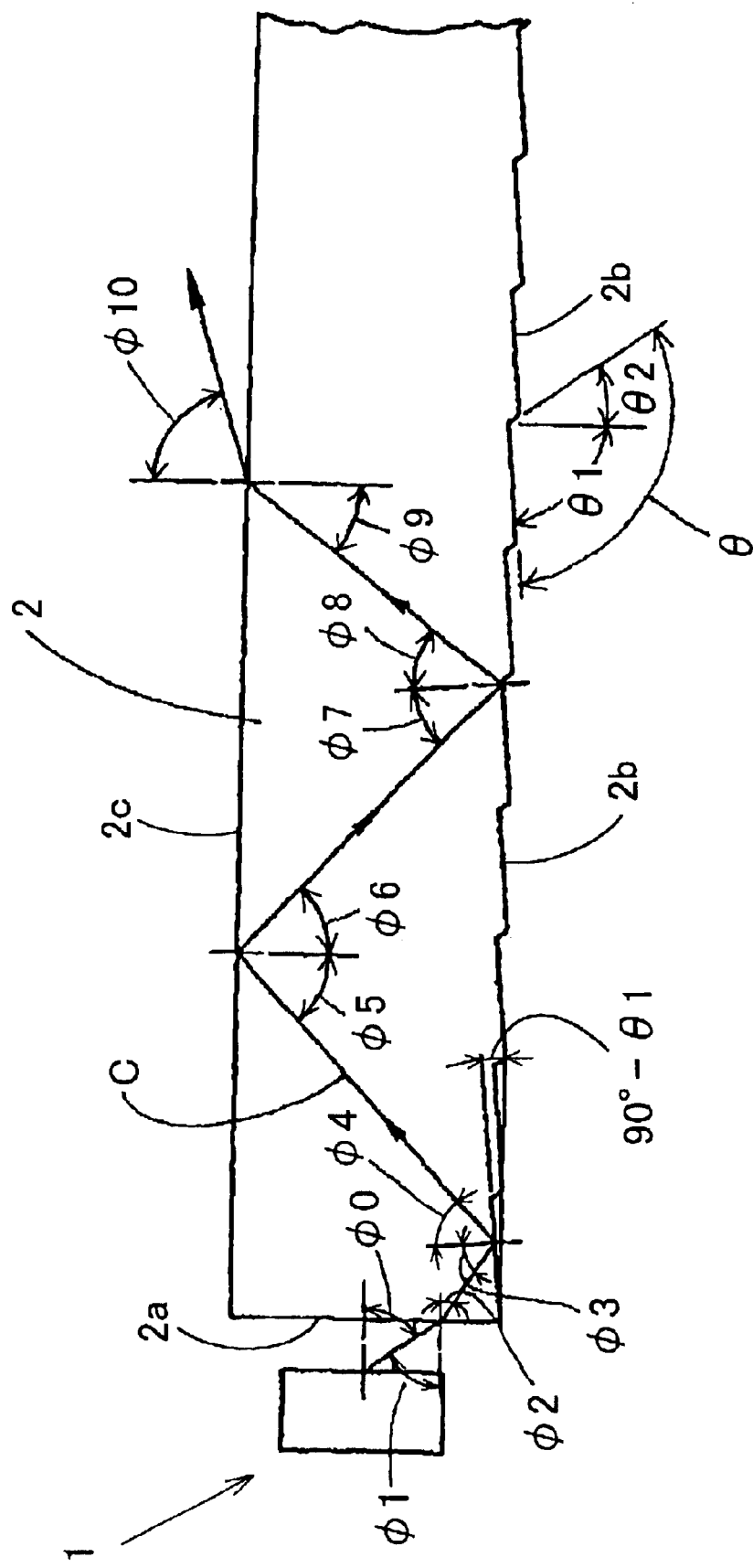
FIG. 3 is an enlarged side view of the lighting panel.
Figure 5:
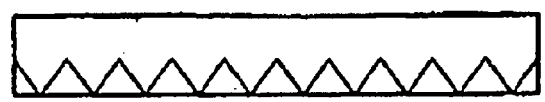
FIGS. 5 and 6 are side views as viewed from illustrated sides.

Referring to FIG. 3, light emitted from the edge light 1 enters the lighting panel 2 at an incident angle $\phi 1$, and the light proceeds in the panel 2 in a direction of $\phi 2$ in accordance with the Snell's law. There are following relationships between angle $\phi 0$ and angle $\phi 2$.

$$\phi 0 = \phi 1 \quad (1)$$

$$n1 \sin \phi 0 = n2 \sin \phi 2 \quad (2)$$

where n1 is the refractive index of air, and n2 is the refractive index of the lighting panel 2.

The light C is reflected by the prism 2b at an angle of (90°−$\theta 1$). There are following relationships between the incident angle $\phi 3$ and the angle of reflection $\phi 4$.

$$\phi 3 + (90° - \theta 1) + \phi 2 = 90° \therefore \phi 3 = \phi 1 - \phi 2 \quad (3)$$

$$\phi 4 = \phi 3 \quad (4)$$

Next, the light C is reflected by the discharge side 2C. There are following relationships between the incident angle $\phi 5$ and the angle of reflection $\phi 6$.

$$\phi 5 = \phi 4 - (90° - \theta 1) \quad (5)$$

$$\phi 6 = \phi 5 \quad (6)$$

Further, the light C is reflected by the prism 2b. There are following relationships between angles $\phi 7$ and $\phi 10$.

$$\phi 7 = \phi 6 - (90° - \theta 1) \quad (7)$$

$$\phi 8 = \phi 7 \quad (8)$$

$$\phi 9 = \phi 8 - (90° - \theta 1) \quad (9)$$

$$n2 \sin \phi 9 = n1 \sin \phi 10$$

$$\text{but, } \phi 9 \leq \sin^{-}(n1/n2) \quad (10)$$

The relationship between incident angles $\phi 3$ and $\phi 7$ and the relationship between incident angles $\phi 5$ and $\phi 9$ are as follows from the above described relationships (3)~(10).

$$\phi 7 = \phi 3 - 2(90° - \theta 1)$$

$$\phi 9 = \phi 5 - 2(90° - \theta 1)$$

This expresses that the incident angle decreases 2(90°−$\theta 1$) by 2(90°−$\theta 1$) if the first inclination angle $\theta(\theta 1.1 \sim \theta 1.n)$ is regarded as the same.

Hereinafter described is discharge operation of the light discharged from the discharge side 2C. In accordance with the Snell's law, when the light enters from a substance having a large refractive index to a substance having a small refractive index, the light is reflected at the interface in the case that the incident angle is larger than a critical angle, and the light is refracted in the case that incident angle is smaller than the critical angle. The critical angle of acrylic resin is about 42°, and the critical angle of polycarbonate is about 39°.

If the above described matter is applied to the lighting panel of the present invention, the incident angle reduces by 2(90°−$\theta 1$) as described above. Therefore, if the incident angle of the light C at the discharge side 2c is larger than the critical angle of the lighting panel, the incident angle becomes always smaller than the critical angle and discharges from the panel with refraction.

If the critical angle is $\phi c$, the amount of discharge light discharged from a point of the lighting panel is in the range between $\phi c$ and $\phi c − (90° − \theta 1)$.

Furthermore, the discharge direction of the light with respect to the normal of the discharge side is as follows.

$$\sin^{-}((n1 \sin \phi c - (90° - \theta 1)) n2) \sim 90°$$

Therefore, the amount of discharge light discharging from the point increases as the angle $\theta 1$ increases.

Namely, if the angle $\theta 1$ is large, a large amount of light rays are discharged from a range near the edge light 1, and the angle of the discharge light rays becomes large thereby dispersing discharge directions.

Therefore, it is preferable to reduce the angle $\theta 1$ to 89.5°~60°. For example, in the case of the LCD of 2 inches, $\theta 1$ is between 88.5° and 87.5°.

As described above, if the first inclination angle $\theta 1(\theta 1.1 \sim \theta 1.n)$ is constant, the light near the optical axis of the emitted light from the edge light 1 is discharged from the lighting panel 2 at a point remote from the edge light 1 as illuminating light. However, the angle $\phi 2$ of the light near the optical axis is small, and hence the incident angle $\phi 3$ is large. Consequently, the next reflecting point (incident angle $\phi 5$) is distant from, the incident surface 2a. Since the incident angle $\phi 5$ is large, the light must repeatedly be reflected before the incident angle becomes smaller than the critical angle. Therefore, there occurs the case that the light discharges from the end surface opposite to the incident surface 2a without illuminating the LCD. As a result, the strength of the illuminating light reduces.

In order to reduce the loss of the light, it is necessary to gradually increase the first inclination angle $\theta 1$ as the distance from the edge light 1 increases.

Since the prisms 2b are concentrically arranged with the light source of the edge light 1, light rays from the light source strike the prisms 2b at the angle of 90 degrees at every position. Therefore, the above described principle of $\theta 1$ is applied to the whole area of the lighting panel 2.

Thus, the amount of light discharged from the end surface is reduced so that the amount of discharge light increases, and the light is uniformly discharged. Further, it is not necessary to manufacture the prisms in fine arrangement.

Figure 4:
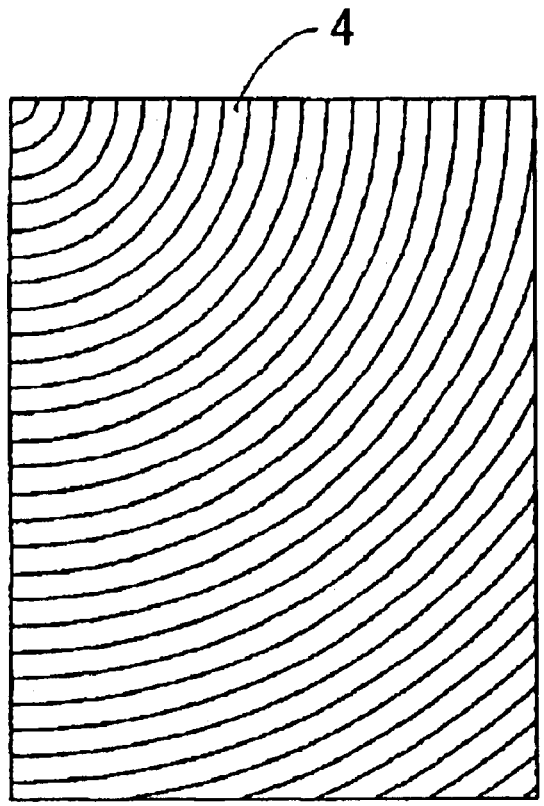
FIG. 4 is a plan view of a lighting panel in a second embodiment of the present invention.
Figure 6:
Figure 8:
FIGS. 8 and 9 are side views as viewed from illustrated sides.
Figure 7:
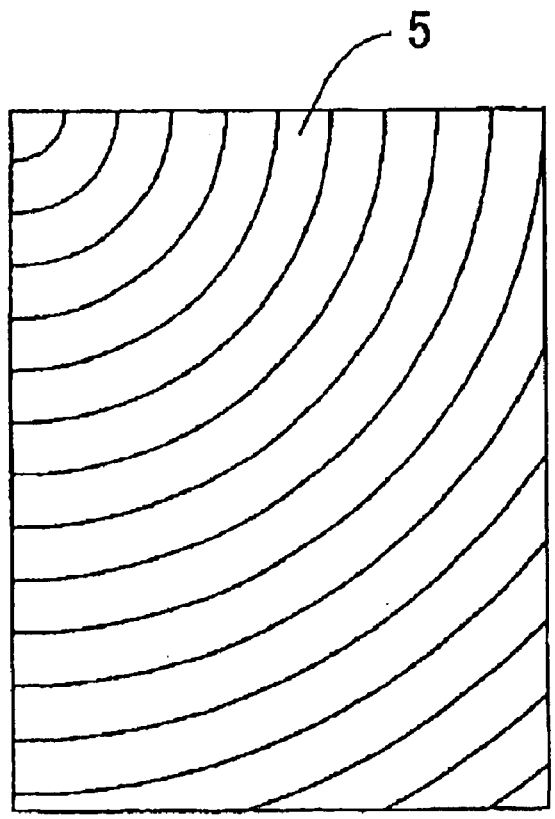
FIG. 7 is a plan view of a lighting panel in a third embodiment of the present invention.
Figure 9:
Figure 10:
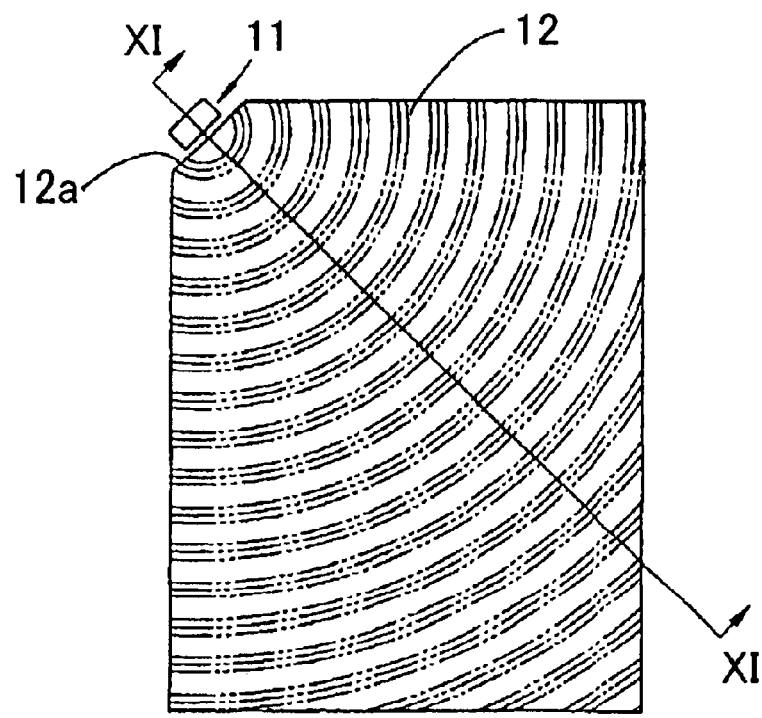
FIG. 10 is a plan view showing a conventional lighting panel.
Figure 11:
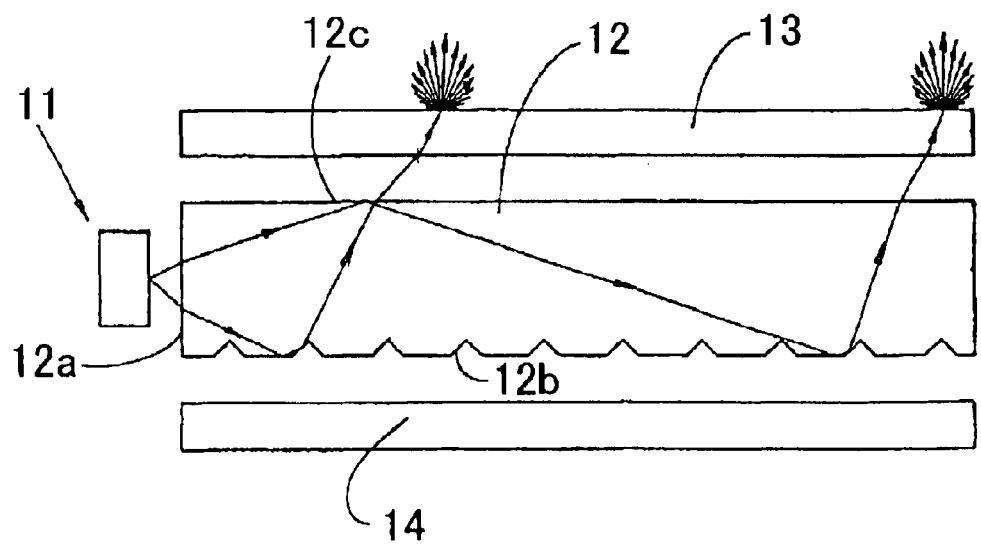
FIG. 11 is a sectional view taken along a line XI—XI of FIG. 10.

Since the light discharged from the lighting panel 2 is collimated, it is possible to change the progressing direction of the light by a special prism sheet shown in FIG. 4 or FIG. 7. In the sheet 4 of FIG. 4 a plurality of circular prisms are concentrically formed with the light source. In the sheet 5 of FIG. 7, circular lenticular lenses are formed.

In accordance with the present invention, the lighting panel can be easily provided with simple arrangement of prisms.

While the invention has been described in conjunction with preferred specific embodiment thereof, it will be understood that this description is intended to illustrate and not limit the scope of the invention, which is defined by the following claims.

What is claimed is:

1. A panel for lighting a display comprising:
a lighting panel made of a transparent plastic and having rectangular both surfaces one of which is a reflection surface and the other is a discharge surface;
an incident surface formed by beveling one of corners of the lighting panel;
an edge light provided corresponding to the incident surface;
a plurality of prisms circularly formed on the reflection surface of the lighting panel;
edge lines of the prisms being concentrically arranged with the edge light at a predetermined interval;
each of the prisms having a vertical angle $\theta$ comprising a first inclination angle $\theta1(\theta1.1\sim\theta1.n)$ on the edge light side and a second inclination angle $\theta2$ opposite to the first inclination angle $\theta1$;
wherein the first inclination angle $\theta1$ is set to $89.5°\sim60°$, and there is a following relationship between the first inclination angle $\theta1$ and the second inclination angle $\theta2$:

$$\theta1(\theta1.1\sim\theta1.n) > \theta2$$

$$\theta1.1 \leq \theta1.2 \leq \ldots \theta1.(m-1) \leq \theta1.$$

$$m \ldots \theta1.(n-1) \leq \theta1.n.$$

2. The panel according to claim 1 further comprising a prism sheet disposed corresponding to the discharge surface of the lighting panel, the prism sheet having a plurality of prisms on a surface corresponding to the discharge surface.

3. The panel according to claim 2 wherein the prism has a circular edge line.

4. The panel according to claim 2 wherein the prism is a circular lenticular lens.

* * * * *